(12) United States Patent
Moteki

(10) Patent No.: US 6,643,473 B2
(45) Date of Patent: Nov. 4, 2003

(54) IMAGE FORMING SYSTEM

(75) Inventor: Kiyotaka Moteki, Tachikawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/053,548

(22) Filed: Jan. 24, 2002

(65) Prior Publication Data
US 2002/0098003 A1 Jul. 25, 2002

(30) Foreign Application Priority Data
Jan. 25, 2001 (JP) ........................ 2001-017533

(51) Int. Cl.$^7$ ............... G03G 15/00; H04N 1/32
(52) U.S. Cl. ............... 399/8; 358/1.15; 399/6; 399/81; 399/82
(58) Field of Search ............ 399/2, 8, 38, 75, 399/81, 82, 85, 6, 194; 358/1.15

(56) References Cited
U.S. PATENT DOCUMENTS 5,452,094 A * 9/1995 Ebner et al. ............ 399/81 X
5,909,602 A * 6/1999 Nakai et al. ............ 399/8
6,167,209 A * 12/2000 Suzuki et al. ............ 399/8

* cited by examiner

Primary Examiner—Sophia S. Chen
(74) Attorney, Agent, or Firm—Oblon, Spivak, McClelland, Maier & Neustadt, P.C.

(57) ABSTRACT

In an image forming system of the present invention, a master image forming apparatus determines, at the beginning of a joint copy job, whether or not a user stamp is registered at a slave image forming apparatus. If the user stamp is not registered at the slave image forming apparatus, the master image forming apparatus executes copying alone. Alternatively, the master image forming apparatus may send the user stamp to the slave image forming apparatus before the joint copy job. The system obviates erroneous copying in a joint copy mode and simply executes the joint copy mode even if the user stamp is not registered at the slave image forming apparatus.

15 Claims, 16 Drawing Sheets

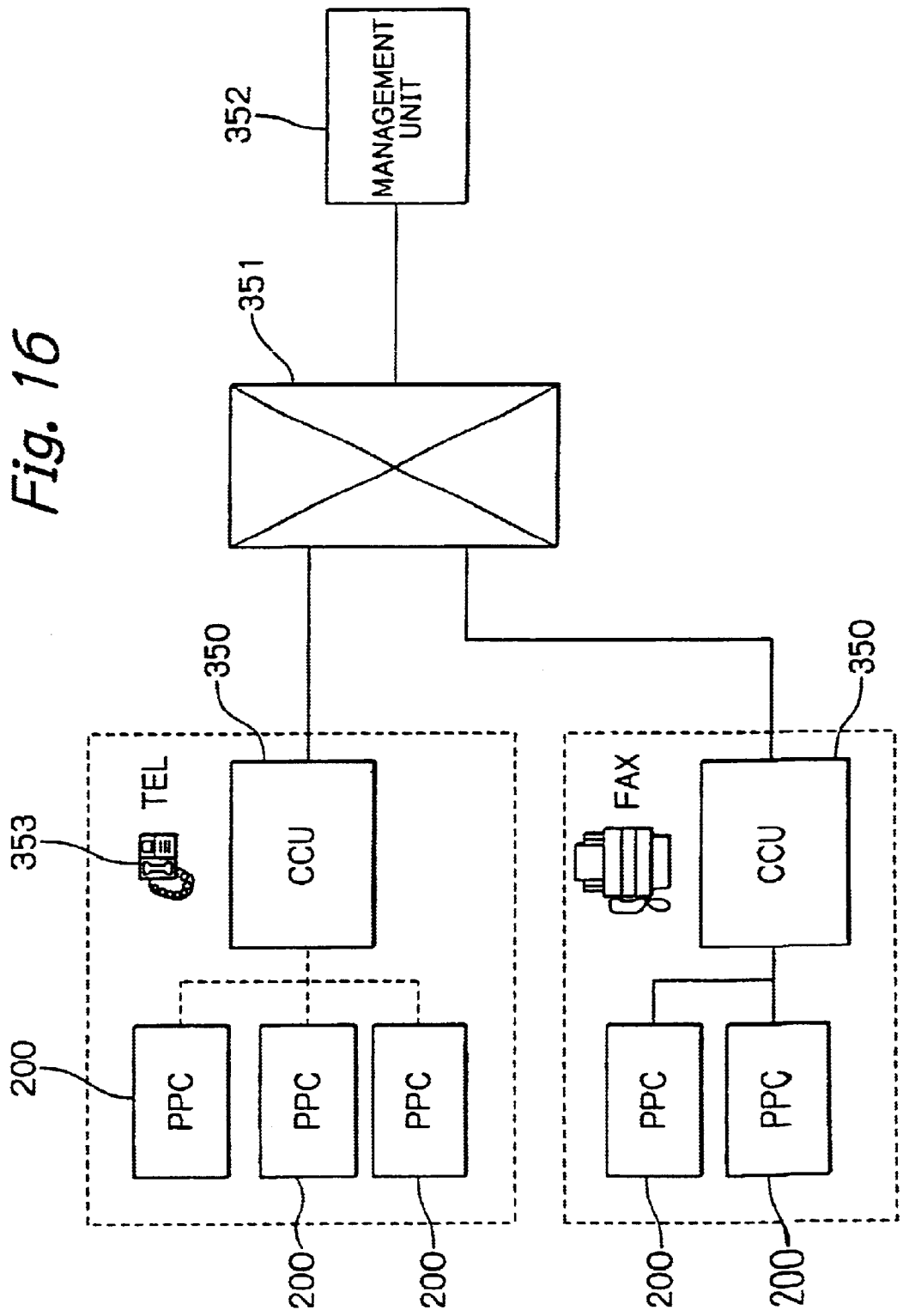

IMAGE FORMING SYSTEM

BACKGROUND OF THE INVENTION

1. Field of the Invention

The present invention relates to an image forming system of the type including a plurality of image scanners, word processors, personal computers or similar image signal outputting means and a plurality of printers or similar image forming means for forming images in accordance with image signals output from the image signal outputting means.

2. Description of the Background Art

An image forming system of the type described has been proposed in various forms for various purposes. Japanese, Patent Laid-Open Publication No. 5-304575, for example, discloses an image forming system including a plurality of digital copiers interconnected for the purpose of implementing high-speed copying. However, assume that a plurality of image forming apparatuses with an image storing capability are connected together, and that a master image forming apparatus transfers an image which it read to a slave image forming apparatus to cause it to print the image in a joint operation mode. Then, if a user stamp registered by the user is not available at the slave image forming apparatus, the slave image forming apparatus prints the image without combining the user stamp with the image.

SUMMARY OF THE INVENTION

It is an object of the present invention to provide an image forming system in which a master image forming unit determines, at the beginning of a joint copy job, whether or not a user stamp is registered at a slave image forming apparatus and then performs copying alone if the answer of the decision is negative, thereby obviating erroneous copying.

It is another object of the present invention to provide an image forming system in which a master image forming apparatus determines, at the beginning of a joint copy job, whether or not a user stamp is registered at a slave image forming apparatus and then transfers, if the answer of the decision is negative, the user stamp to the slave image forming apparatus before the joint copy job, thereby effecting the joint copy job with the user stamp while reducing the operator's work.

It is a further object of the present invention to provide an image forming system in which a slave image forming apparatus deletes a user stamp after a joint copy job for thereby promoting the efficient use of a memory.

In an image forming system of the present invention including a plurality of image forming apparatuses, the image forming apparatuses each include a reading device for reading a document and a printing device for printing an image read by the reading device. A joint operation device transfers the image read by the reading device to another image forming apparatus and causes it to print the image. A joint copy mode selecting device commands the joint operation device to execute a joint copy mode operation. A registering device allows the operator to register a user stamp to be combined with the image in the event of printing. A combining device combines the user stamp and image. A decision device determines whether or not the user stamp is registered at the another image forming apparatus to which the joint operation device has transferred the image. When the joint copy mode operation is selected and if the user stamp is registered at the another image forming apparatus, as determined by the decision device, the joint operation device executes the joint copy mode operation.

BRIEF DESCRIPTION OF THE DRAWINGS

The above and other objects, features and advantages of the present invention will become more apparent from the following detailed description taken with the accompanying drawings in which:

FIG. 16 is a block diagram showing a specific configuration of a CSS (Client Server System) included in the illustrative embodiment.

DESCRIPTION OF THE PREFERRED EMBODIMENTS

Figure 1:
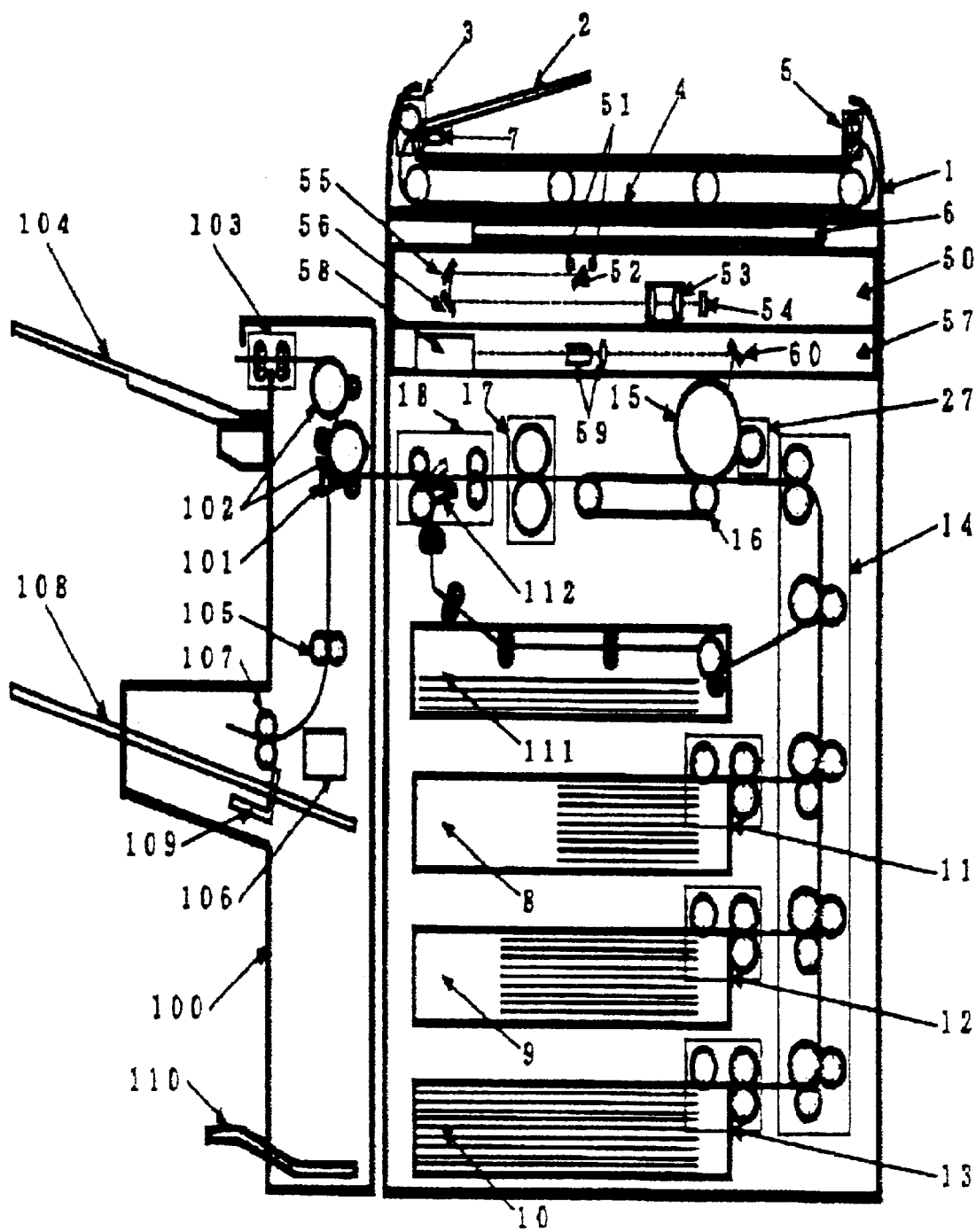
FIG. 1 is a view showing an image forming apparatus included in an image forming system embodying the present invention.
Figure 2:
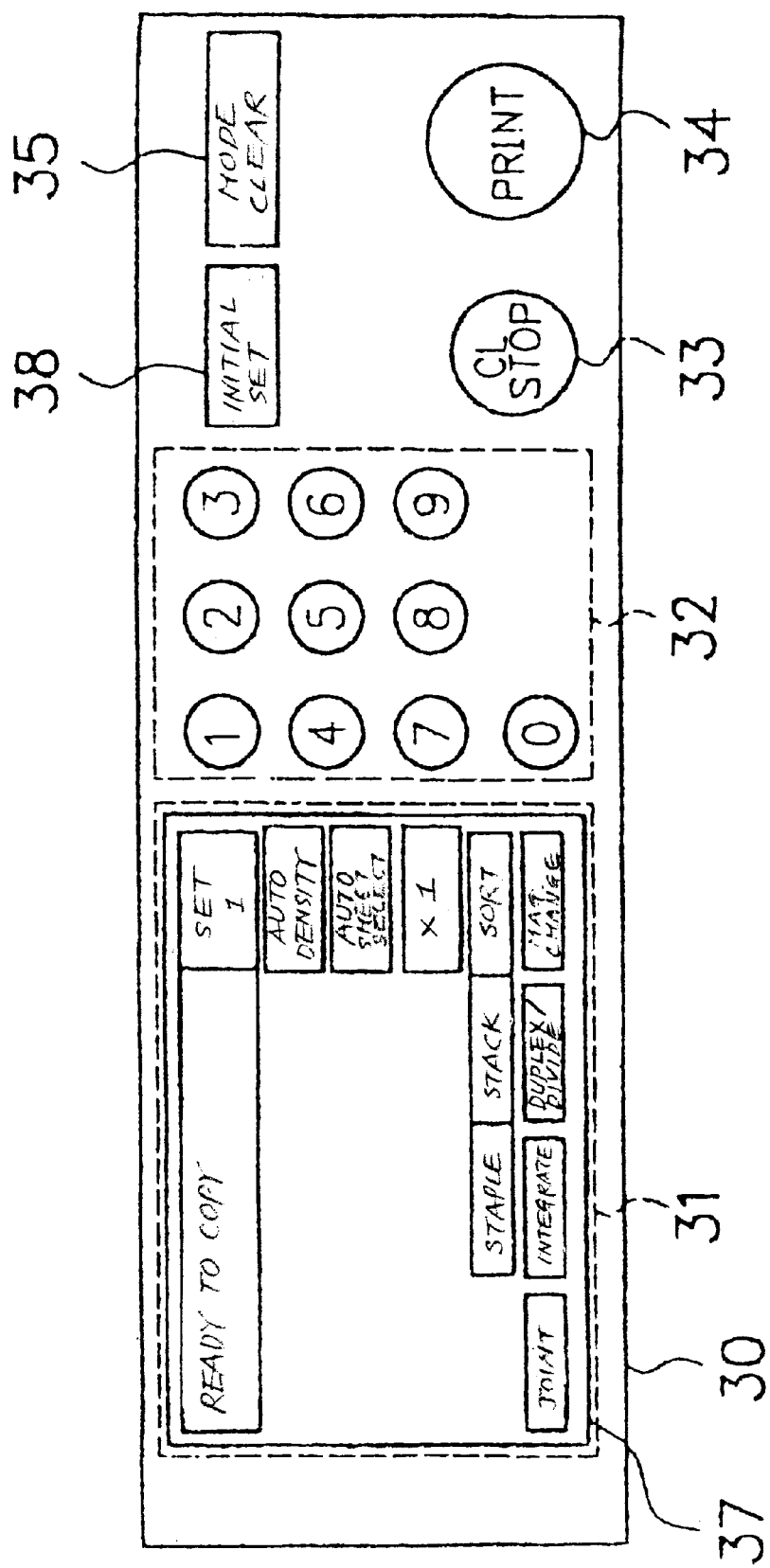
FIG. 2 is a plan view showing a specific configuration of an operation panel mounted on the image forming apparatus.

Referring to FIG. 1 of the drawings, an image forming apparatus embodying the present invention is shown. As shown, the image forming apparatus includes an ADF (Automatic Document Feeder) 1 including a document tray 2. As shown in FIG. 2, a print start key 34 is positioned on an operation panel 30. When the print start key 34 is pressed, a pickup roller 3 sequentially pays out documents stacked on the document tray 2, the lowermost document first. A belt conveyor 4 conveys the document paid out from the document tray 2 to a preselected position on a glass platen 6.

After an image reading unit 50 has read image data out of the document positioned on the glass platen 6, the belt conveyor 4 and an outlet roller pair 5 drive the document out of the ADF 1. When a document set sensor 7 senses the next document present on the document tray 2, the document is conveyed to the glass platen 6 in the same manner as the previous document. A motor, not shown, drives the pickup roller 3, belt conveyor 4, and outlet roller pair 5.

A first, a second and a third tray 8, 9 and 10 each are loaded with a stack of sheets of particular size. A first, a second find a third pickup device 11, 12 and 13 pay out the sheets from the trays 8, 9 and 10, respectively. A vertical conveying unit 14 conveys the sheet fed from any one of the trays 8 through 10 to a position where the sheet contacts a photoconductive drum 15. An image writing unit 57 writes the image data output from the reading unit 50 on the drum 15 with a laser beam to thereby form a latent image. A developing unit 27 develops the latent image with toner for thereby producing a corresponding toner image.

A belt 16 conveys the sheet at a speed equal to the rotation speed of the drum 15, so that the toner image is transferred from the drum 15 to the sheet. A fixing unit 17 fixes the toner image on the sheet. A sheet discharging unit 18 drives the sheet with the fixed toner image into a finisher 100 with an outlet roller pair not shown.

Usually, the finisher 100 selectively steers the incoming sheet toward an outlet roller pair 102 or toward a stapler, which will be described hereinafter. Further, the finisher 100 is capable of shifting a switch plate 101 upward in order to discharge the sheet to a usual print tray 104 via a roller pair 103. Alternatively, the finisher 100 may shift the switch plate 101 downward in order to steer the sheet to a staple table 108 via roller pairs 105 and 107.

Every time one sheet is driven out to the staple tray 108, a jogger 109 positions the sheet. When sheets constituting a single set or copy are stacked on the staple tray 108, a stapler 106 staples the sheet. The stapled set of sheets is let fall onto a tray 110 due to its own weight.

The usual print tray 104 is movable forward or backward in the direction perpendicular to the sheet surface of FIG. 1. More specifically, the print tray 104 is movable back and forth document by document or set by set, which is sorted via an image memory, to thereby simply sort copies sequentially driven out to the tray 104.

In a duplex print mode for printing images on both sides of the sheet, the sheet fed from any one of the trays 8 through 10 and carrying an image on one side thereof is not driven out to the tray 104, but is steered to a duplex print unit 111 via a path selector 112. Subsequently, the duplex print unit 111 again feeds the one-sided sheet toward the drum 15 for forming another image on the other side of the sheet.

A main motor, not shown, drives the drum 15, belt conveyor 16, fixing unit 17, sheet discharging unit 18, and developing unit 27. The rotation of the main motor is transferred to the pickup devices 11 through 13 via respective sheet feed clutches not shown. Also, the rotation of the main motor is transmitted to the vertical conveying unit 14 via an intermediate clutch not shown.

FIG. 2 shows a specific configuration of the operation panel 30 mounted on the image forming apparatus. As shown, an LC touch panel 31, numeral keys 32, a clear/stop key 33, a mode clear key 35 and an initial set key 38 are arranged on the operation panel 30 in addition to the print start key 34. The LC touch panel 31 displays various function keys 37, a number of sets or copies, a message showing the operator the status of the apparatus, and so forth.

Figure 3:
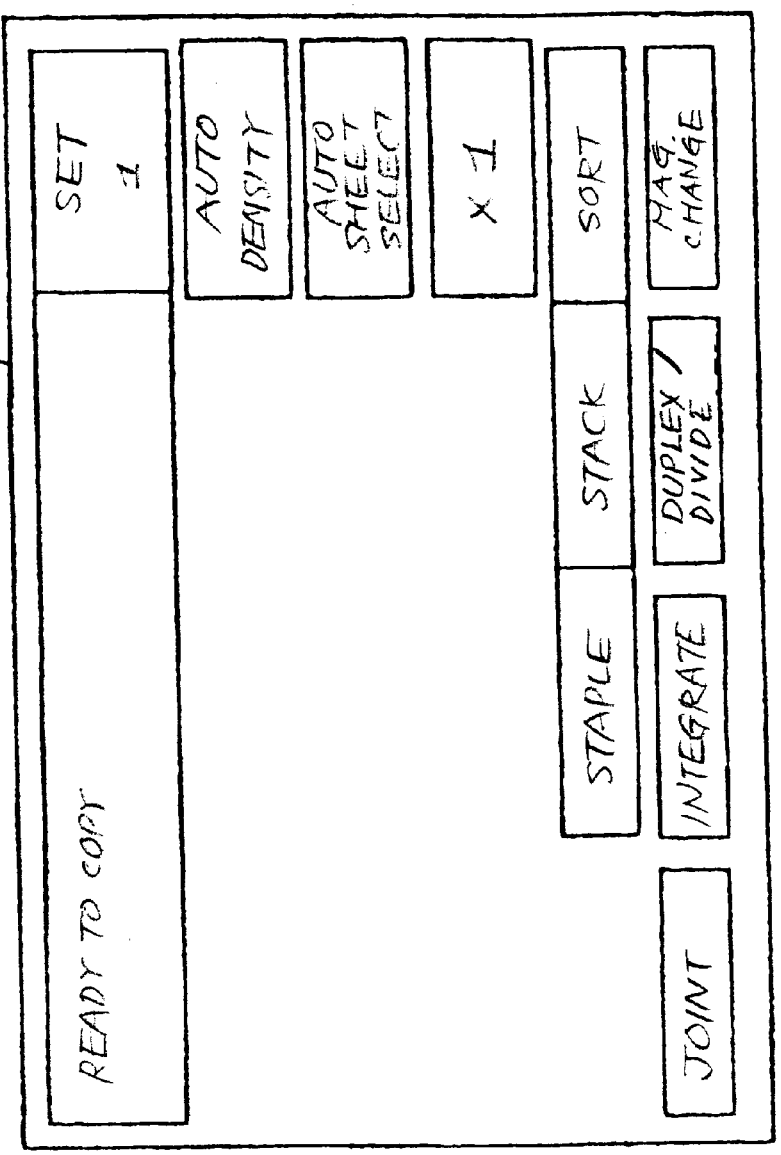
FIG. 3 shows a specific picture to appear on an LC (Liquid Crystal) touch panel included in the operation panel.

FIG. 3 shows a specific picture appearing on the LC touch panel 31. As shown, the picture includes various keys each being highlighted when touched. When the operator who desires more detailed information on a desired function touches a key assigned to the function, the picture is replaced with a picture displaying the details. In this manner, the LC touch panel 31 uses a dot display and can therefore graphically display optimal information each time.

The LC touch panel 31 has a message area at its top left position, as viewed in FIG. 3. The message area displays various messages including "Ready to copy" and "Wait". The number of copies set by the operator appears at the right-hand side of the message area. An auto-density key for automatically controlling image density is positioned beneath the number of copies set. There are also shown on the LC touch panel 31 an auto-sheet select key for automatically selecting sheets to use, a sort key for sorting copies set by set in order of page, a stack key for sorting copies page by page, a staple key for stapling sorted sheets set by set, a ×1 key for setting ×1 magnification, a magnification change key for setting enlargement or reduction, a duplex print key, an erase/move key for setting, e.g., a margin mode, and a joint mode key for dividing a great number of prints into a plurality of groups via the network of digital copiers.

Referring again to FIG. 1, the image reading unit 50 includes optics in addition to the glass platen 6. The optics includes a lamp or light source 51, a first mirror 52, a lens 53, and a CCD (Charge Coupled Device) array or similar image sensor 54. The lamp 51 and first mirror 52 are mounted on a first carriage, not shown, while the second mirror 55 and third mirror 56 are mounted on a second carriage not shown.

To read the document positioned on the glass platen 6, the first carriage and second carriages are mechanically moved at a relative speed ratio of 2:1 so as not to vary the length of an optical path. A scanner motor, not shown, drives the optics. The image sensor 54 reads the document image and converts it to an electric signal. The lens 53 and image sensor 54 are movable in the right-and left direction in FIG. 1 in accordance with a desired magnification.

The image writing unit 57 includes a laser unit 58, a lens 59, and a mirror 60. The laser unit 58 accommodates therein a laser diode or light source and a polygonal mirror, which is rotated by a motor, not shown, at high speed. A laser beam issuing from the laser unit 58 is deflected by the polygonal mirror and then reflected by the mirror 60 to form a beam spot on the drum 15.

More specifically, the laser beam deflected by the polygonal mirror scans the surface of the drum 15 perpendicularly to the direction of rotation of the drum 15, i.e., in the main scanning direction. The laser beam writes image data on the drum 15 line by line in accordance with an image signal output from a selector 64 (see FIG. 9), which is included in an image processing section.

The electric image signal output from the image reading device, the electric signal input to the image forming apparatus and synchronizing signals will hereinafter be collectively referred to as an image or image data for simplicity. The laser beam repeatedly scans the drum 15 at a preselected period corresponding to the rotation speed of the drum 15 and recording density, thereby forming a latent image on the drum 15.

A beam sensor, not shown, is located at a position adjoining one end of the drum 15 and to which the laser beam is to be incident. The beam sensor outputs a main scan synchronizing signal on sensing the laser beam. The main scan synchronizing signal is used to control the timing for starting image recording in the main scanning direction and to generate a control signal for inputting and outputting an image signal, as will be described specifically later.

Figure 9:
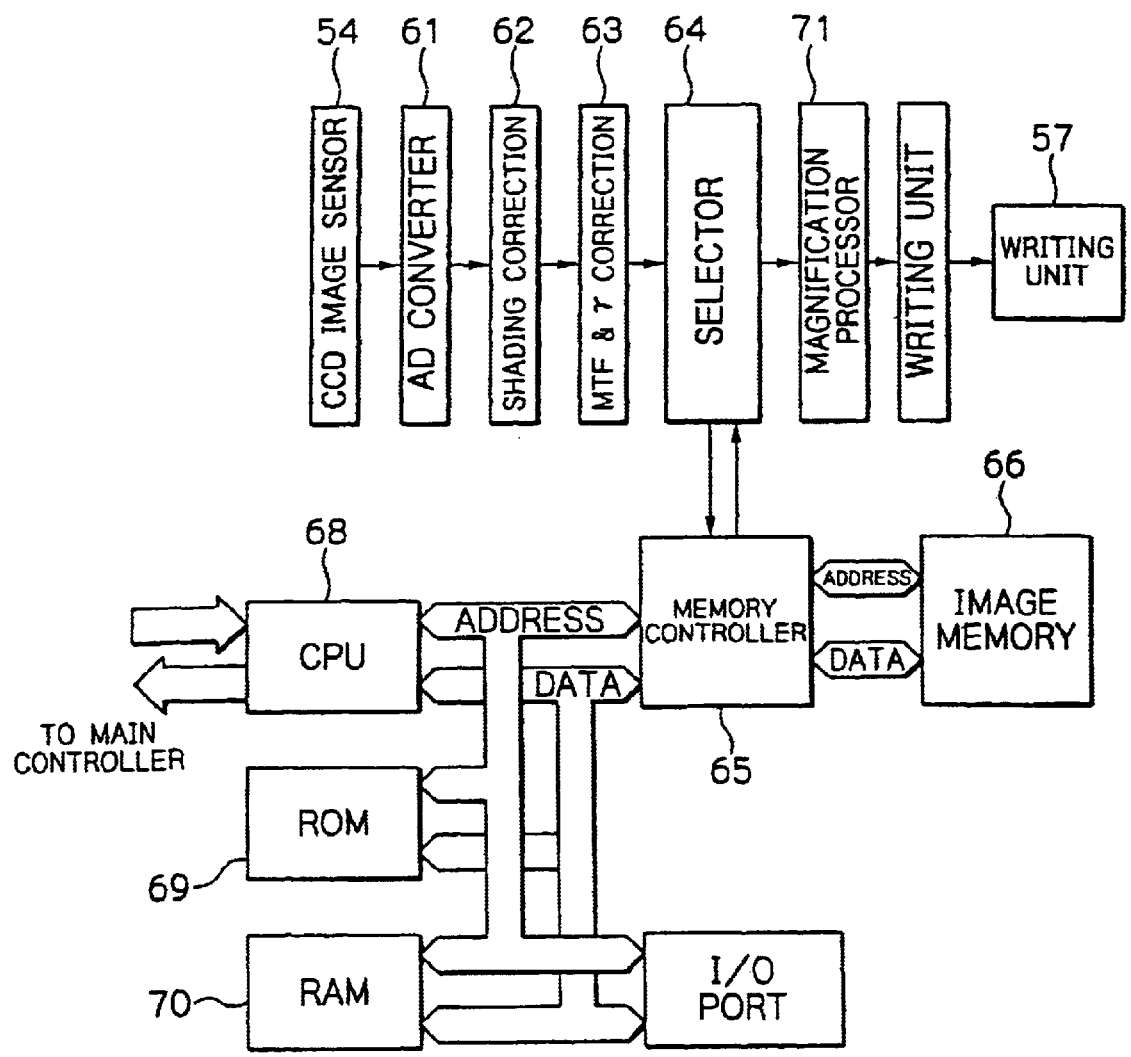
FIG. 9 is a schematic block diagram showing a specific configuration of an image processing section included in the image forming apparatus.

FIG. 9 shows a specific configuration of the previously mentioned image processing section (image reading section and image writing section). As shown, when the lamp 51 illuminates the document laid on the glass platen, the resulting imagewise reflection is incident to the CCD image sensor 54 via a lens not shown. The CCD image sensor 54 transforms the incident reflection to an electric signal. An AD (Analog-to-Digital) converter 61 converts the electric signal to a corresponding digital signal.

A shading corrector 62 corrects the shading of the digital image signal output from the AD converter 61. Shading is ascribable to the irregular light distribution of the light source and the irregular sensitivity of the image sensor. An MTF (Modulation Transfer Function) and γ corrector 63 executes MTF correction and γ correction with the image signal output from the shading corrector 62. MTF correction obviates blur ascribable to the optics. A selector 64 selectively feeds the image signal to a magnification processor 71 or an image memory controller 65. The magnification processor 71 enlarges or reduces the image signal in accordance with a desired magnification. The image signal output from the magnification processor 71 is input to the image writing unit 57. The selector 64 and image memory controller 65 are capable of interchanging image signals with each other.

The image processing section is capable of selectively inputting or outputting a plurality of different kinds of data, although not shown in FIG. 9 specifically. For example, the image processing section is capable of dealing with image data output from a personal computer or similar data processing unit.

A CPU (Central Processing Unit) 68 controls the setting of the image memory controller 65, image reading section 50, and image writing section 57. A ROM (Read Only Memory) 69 and a RAM (Random Access Memory) 70 respectively store a program and interim data to be dealt with by the CPU 68. Further, the CPU 68 is capable of writing and reading data out of an image memory 66.

Figure 11:
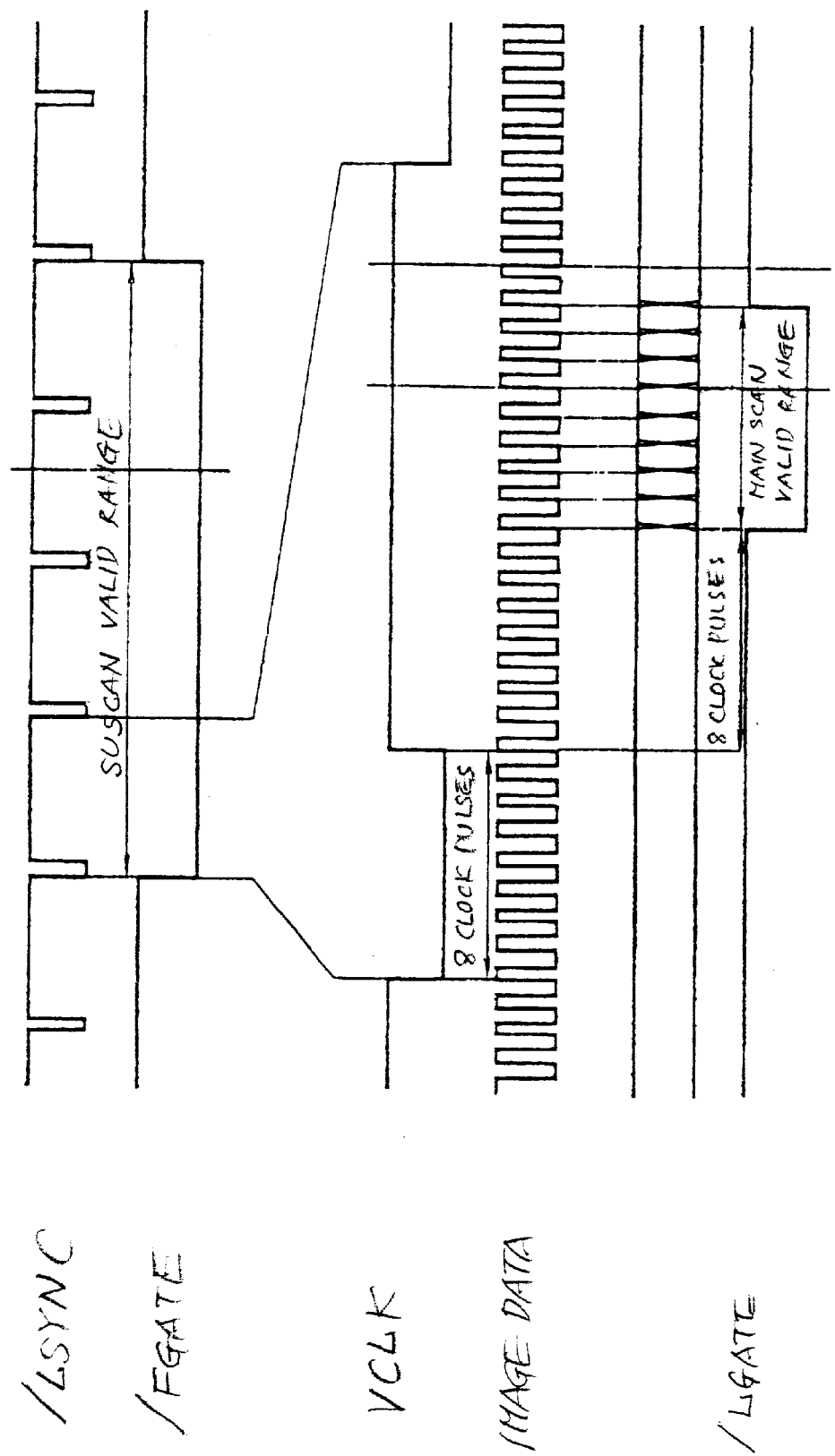
FIG. 11 is a timing chart showing various signals to appear in the image processing section.

Reference will be made to FIG. 11 for describing one page of image signal input to the selector 64. In FIG. 11, a frame gate signal /FGATE is representative of the valid period of one page of image data in the subscanning direction. A line gate signal /LSYNC is the main scan synchronizing signal appearing line by line; the image signal becomes valid when a preselected number of clock pulses appear after the positive-going edge of the signal /LSYNC. The frame gate signal /FGATE and line gate signal /LSYNC are synchronous to a pixel clock VCLK. One pixel data is input to the selector 64 for each period of the pixel clock VCLK. The image processor assigns a particular /FGATE, /LSYNC, /LGATE and VCLK generating mechanism to each of the input and output of an image, so that the input and output of an image can be combined in various ways.

Figure 10:
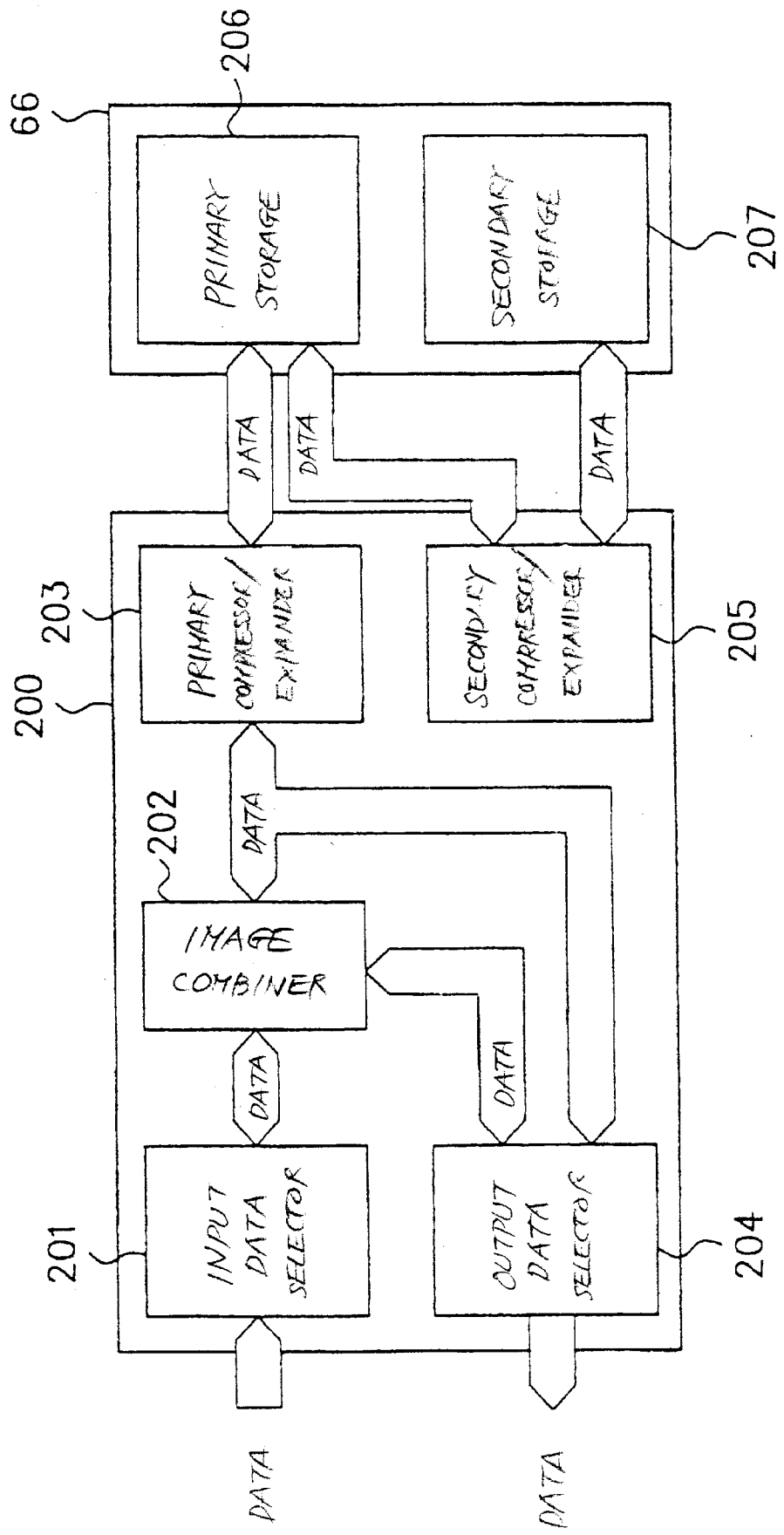
FIG. 10 is a block diagram schematically showing a specific configuration of a memory controller and an image memory included in the image processing section.

FIG. 10 shows the memory controller 65 and image memory 66 in detail. As shown, the memory controller 65 includes an input data selector 201, an image combiner 202, a primary compressor/expander 203, an output data selector 204, and a secondary compressor/expander 205. The CPU 68 sets particular control data in each of the above blocks 201 through 205. In FIG. 9, "address" and "data" are representative of image data; data and address input to the CPU 68 are not shown.

As shown in FIG. 10, the image memory 66 is made up of a primary and a secondary storage 206 and 207. The primary storage 206 allows data to be written and read thereoutof at high speed substantially in synchronism with the transfer rate of the input image data. For this purpose, the primary storage 206 is implemented by a DRAM (Dynamic RAM) or similar high-speed access memory.

The primary storage 206 has a plurality of areas each being assigned to image data of particular size, so that image can be input and output at the same time. More specifically, two sets of address and data lines connect the primary storage 206 to an interface, which interfaces the primary storage 206 to the memory controller 65, and are respectively assigned to reading and writing. This allows image data to be read out of, e.g., an area 2 when image data are being written to an area 1.

The secondary storage 207 is a large-capacity memory for storing image data in order to implement combination of input images or sorting of images. The primary and secondary storages 206 and 207 both may, of course, be implemented by high-speed access memories, so that they can deal with image data in the same manner and can therefore be easily controlled. However, because a DRAM or similar high-speed access memory is expensive, the secondary storage 207 is implemented by an inexpensive, large-capacity recording medium. The input and output of data from the secondary memory 207 is effected by way of the primary storage 206.

With the image memory 66 having the above configuration, it is possible to construct an image forming apparatus capable of inputting, outputting, storing, editing or otherwise processing a great amount of image data with a low cost, relatively simple configuration.

The operation of the memory controller 65 will be described hereinafter. How image data are written to the image memory 66 will be described first. The input data selector 201 selects, among a plurality of data input thereto, image data to be written to the primary storage 206. The image data selected by the selector 201 is input to the image combiner 202 and combined with image data existing in the primary storage 206 thereby. The primary compression/expander 203 compresses combined image data output from the image combiner 202 and writes the compressed image data in the primary storage 206. The image data written to the primary storage 206 is further compressed by the secondary compressor/expander 205 and then written to the secondary storage 207, if necessary.

How image data are read out of the image memory 66 will be described next. Assume that an image to be output exists in the primary storage 206. Then, the primary compressor/expander 203 expands the image data read out of the primary storage 206. The output data selector 204 selects the expanded data or the expanded data and input data combined together and then outputs it.

The image combiner 202 executes the combination of image data present in the primary storage 206 and input data (image data phase adjusting function) and the selection of the destination of combined data (image outputting, write-back to the primary storage 206, and simultaneous output to both of two destinations.

If an image to be output is absent in the primary storage 206, then the secondary compressor/expander 205 expands the image data to be output stored in the secondary storage 207 and then writes the expanded image data in the primary storage 206. This is also followed by the operation of the output data selector 204 described above.

Figure 4:
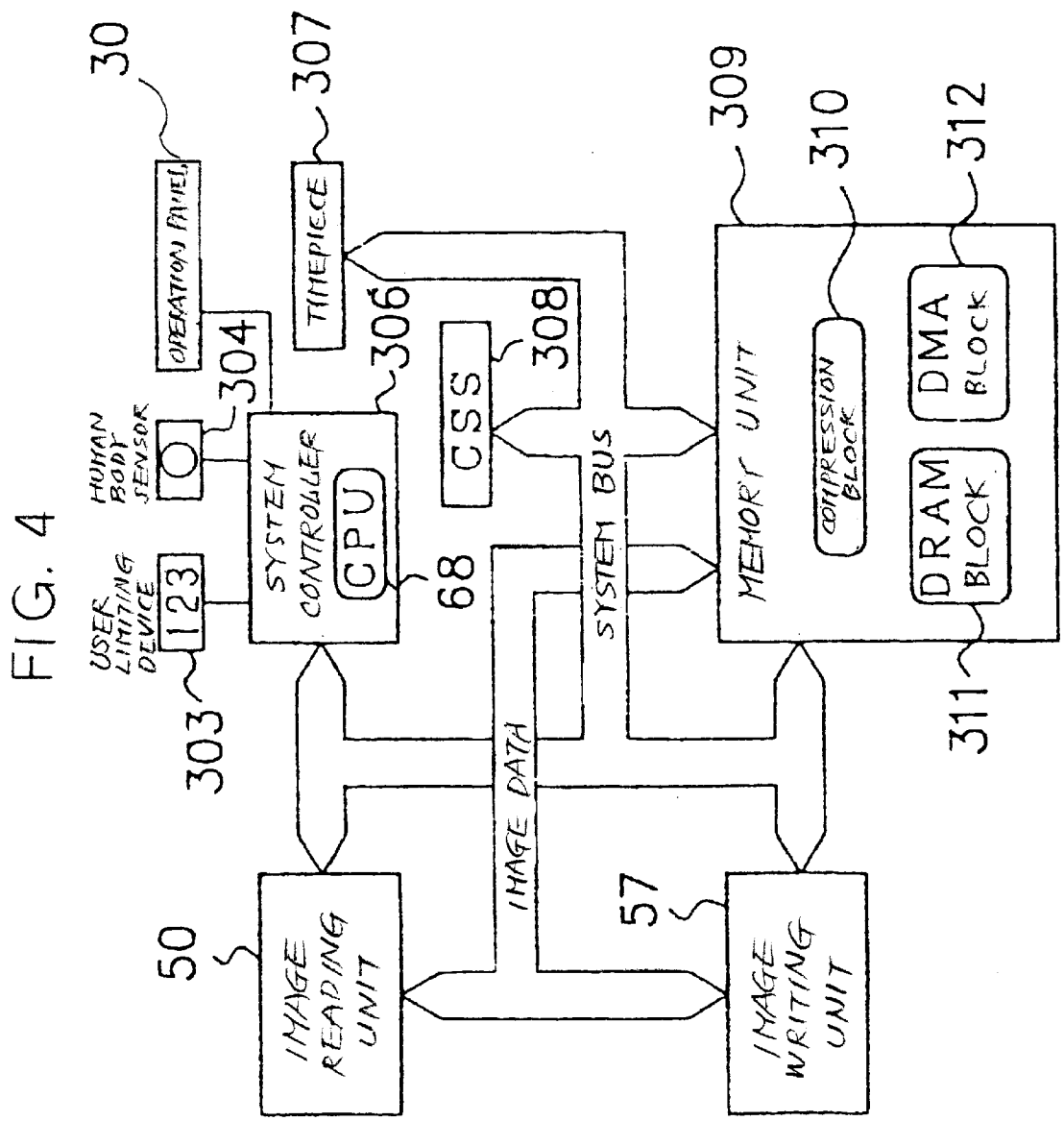
FIG. 4 is a schematic block diagram showing a specific hardware configuration of the image forming apparatus.
Figure 5:
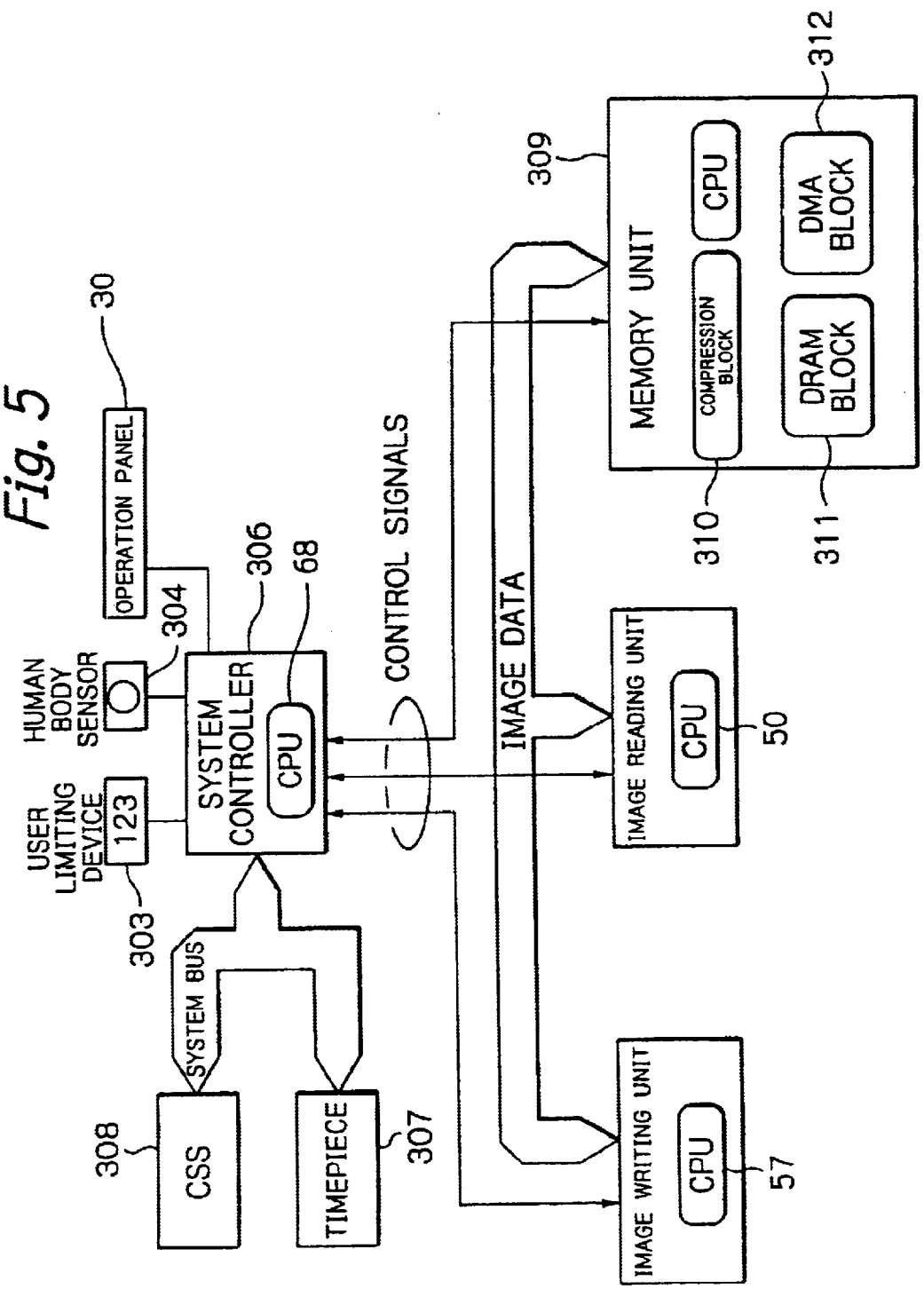
FIG. 5 is a schematic block diagram showing another specific hardware configuration of the image forming apparatus.

FIGS. 4 and 5 respectively show a first and a second specific hardware configuration of the image forming apparatus. As shown in FIG. 4, the first hardware configuration includes a memory unit 309 made up of a compression block 310, a DRAM block 311, and a DMA (Direct Memory Access) block 312. The DRAM block 311 stores the image signal output from the image reading section 50 and can transfer image data stored therein to the image writing section 57 in response to a request from a system controller 306. The compression block 310 has an MH, MR, MMR or similar compressing function and compresses an image read for thereby promoting the efficient use of the memory (DRAM). In addition, the memory unit 309 rotates an image by changing addresses to read out of the image writing section 57 as well as direction.

A user limiting device 303 is connected to the system controller 306 for limiting persons expected to use the apparatus. The user limiting device 303 may be implemented as a coin rack, a key counter, a key card, a prepaid card or a code number by way of example. A human body sensor 304 and a timepiece 307 are also connected to the system controller 306.

More specifically, in FIG. 4, the CPU 68 included in the system controller 306 controls the image reading section 50, image writing section 57, memory unit 309 and a CSS (Client Server System) 308 alone. The CSS is sometimes referred to as a remote diagnosis system or an image forming apparatus management system. On the other hand, in FIG. 5, the image reading section 50, image writing section 57 and memory unit 309 each include a respective CPU; the system controller 306 sends commands to such CPUs via control signal lines. In this manner, the illustrative embodiment is practicable with any desired system hardware configuration.

Figure 6:
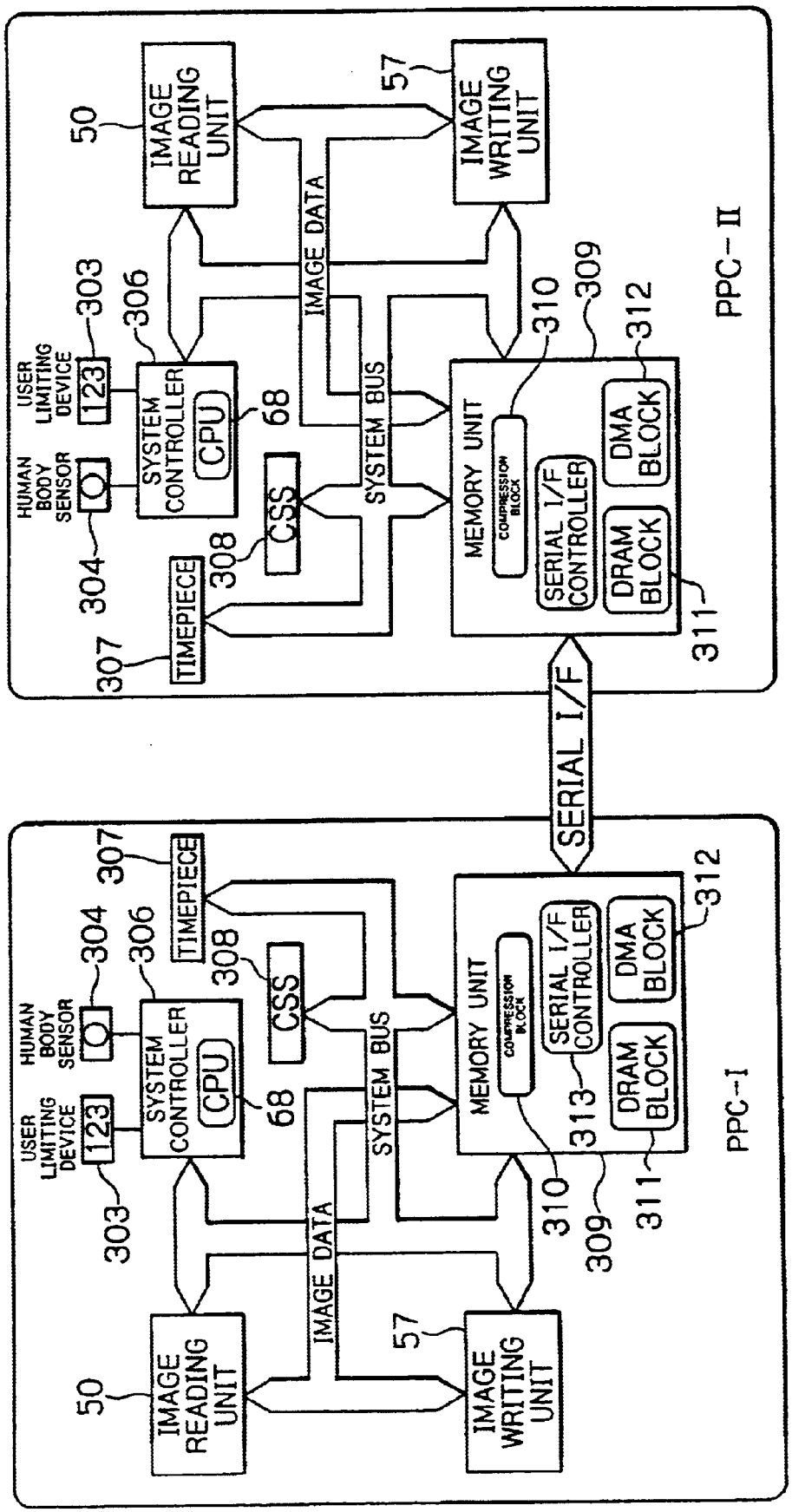
FIG. 6 is a schematic block diagram showing two digital PPC (Plain Paper Copiers) connected together in the illustrative embodiment.

FIG. 6 shows two digital PPCs connected together via a serial I/F and operable in a joint mode. The serial I/F is exclusively assigned to the transfer of image data. Of course, conventional RS232C or similar serial I/F, not shown, also connects the two PPCs for the interchange of set conditions, the number of documents and the number of prints as well as for the response to a communication error.

Figure 7:
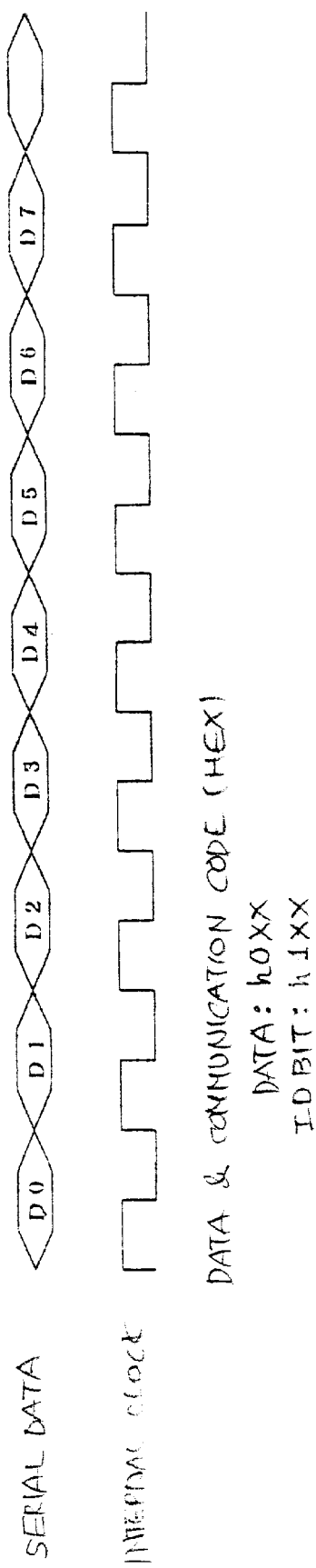
FIG. 7 shows serial data interchanged between the PPCs of FIG. 6 during joint mode operation.

FIG. 7 shows specific serial data transferred via the serial I/F. As shown, the serial data consists of eight bits of data and one bit of ID (identification) bit, which is a data/communication error detection code. The serial data has therefore nine bits in total. The ID bit and communication error detection code are sent as "0" and "1", respectively. When the sending PPC (master) transfers one page of image data to the receiving PPC (slave), it produces the sum of eight bits of data, calculates a communication error detection code such that the sum of the code is "0", and then sends the calculated code at the end of one page of data.

The receiving PPC produces the sum of received data. The receiving PCC then determines that the data receipt is successful if the sum of the sum of the data and error detection code is "0" or determines that a communication error has occurred if otherwise and reports it to the sending PPC.

Figure 15:
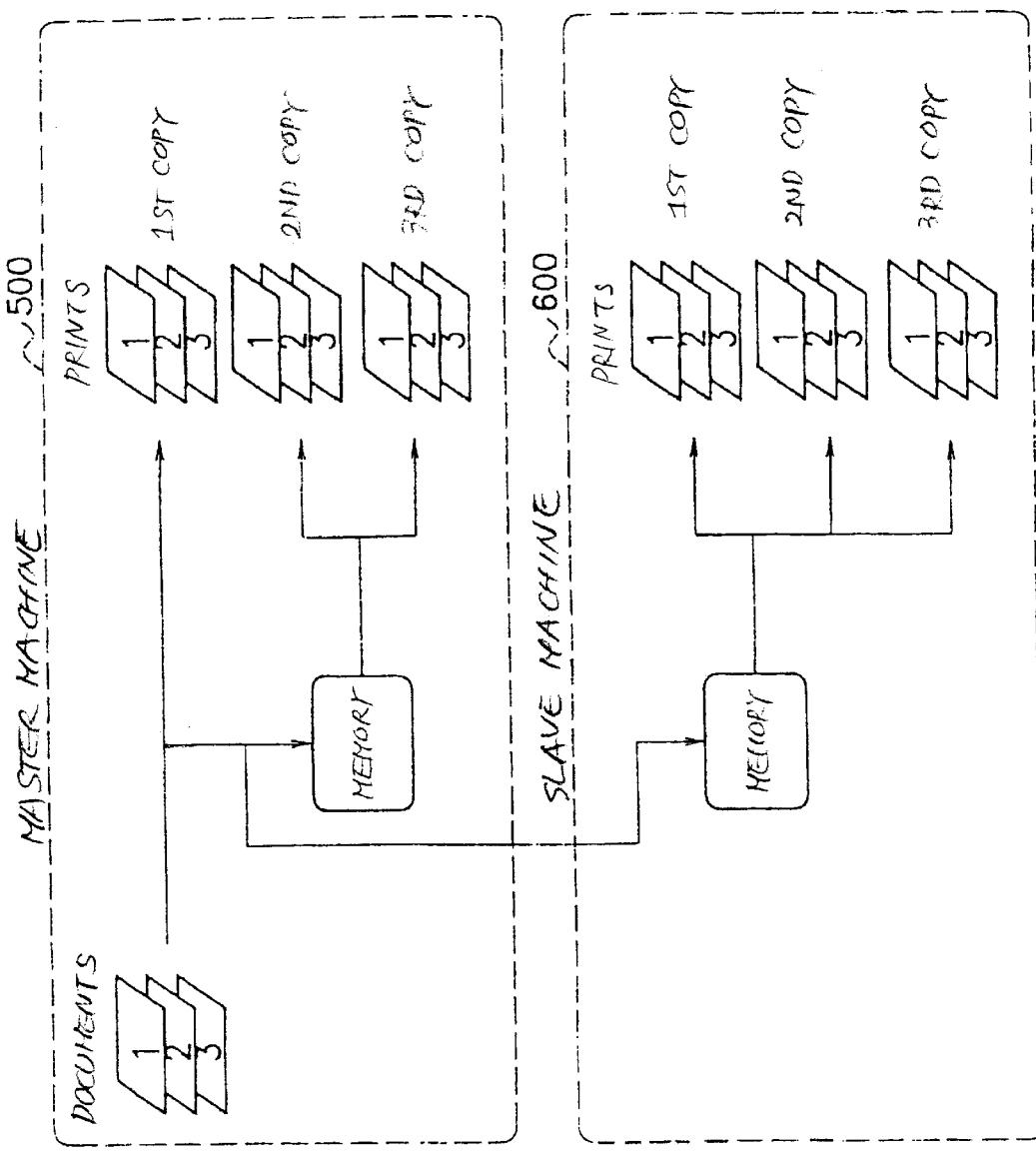
FIG. 15 shows a specific electronic sort mode operation available with the illustrative embodiment.

FIG. 15 demonstrates a specific joint mode operation available with a master machine and a slave machine. As shown, assume that in an electronic sort mode available with a memory, a master machine 500 and a slave machine 600 cooperate to produce six sets or copies of prints. Then, the master machine 500 sequentially prints images read by the scanner while storing image data in the memory. On completing the first set of prints, the master machine 500 reads the image data out of the memory to thereby produce the second sets of prints. The master machine 500 then outputs the third set of prints in the same manner as it has output the second sets of prints. The slave machine 600 writes the image data received from the master machine 500 in its memory and then starts outputting the first set or volume of prints.

Figure 8:
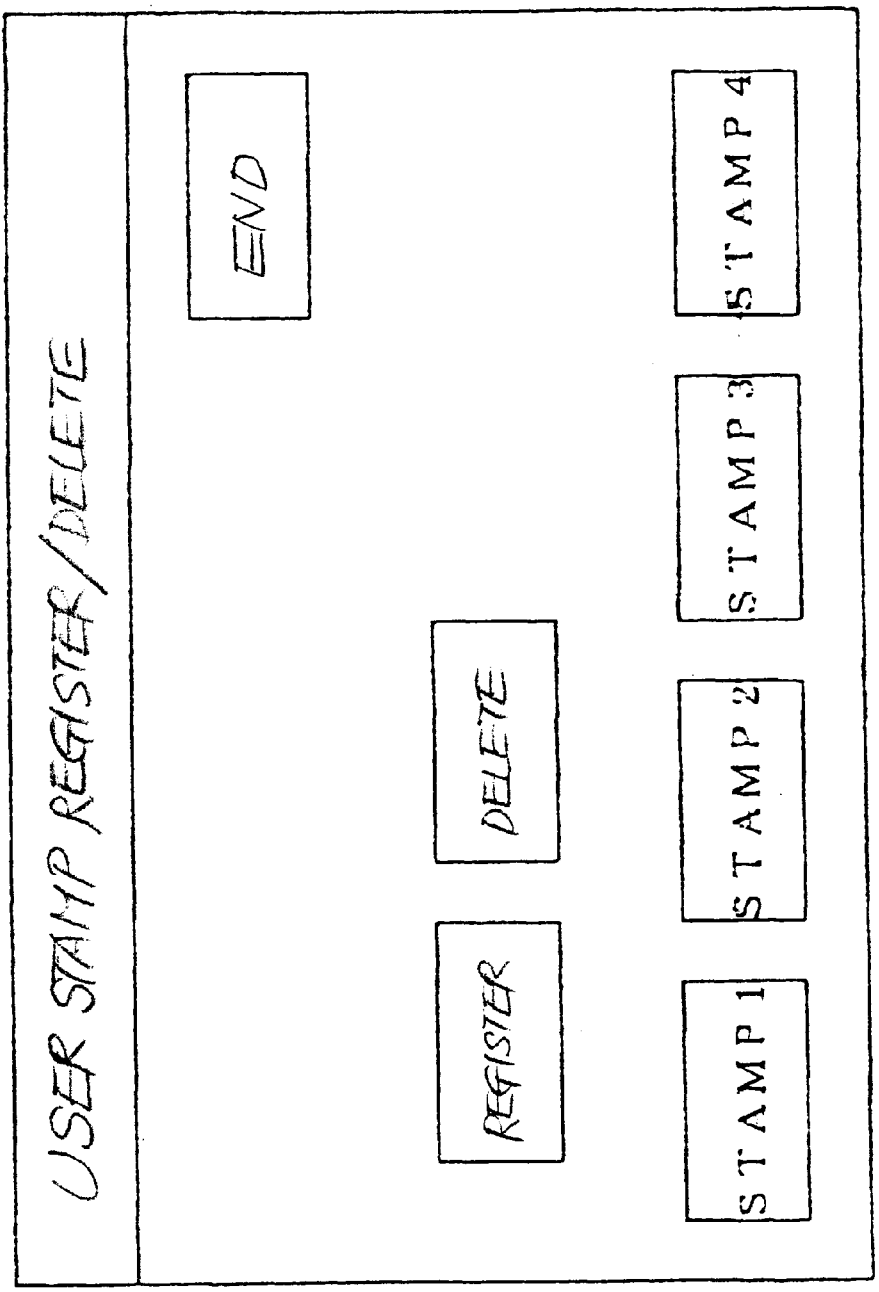
FIG. 8 shows a specific picture to appear on the LC touch panel for allowing the operator to register or delete a user stamp.

A procedure for registering a user stamp will be described hereinafter. FIG. 8 shows a specific picture to appear on the LC touch panel 31, FIG. 2, for allowing a user stamp to be registered or deleted. Specifically, the operator selects a user stamp registration mode on the operation panel 30, FIG. 2, selects a registered user number, sets a desired document on the glass platen 6, and then presses the print start button 34. Then, the user stamp is written to and registered at the secondary storage 207, FIG. 10, together with an image. The user stamp and image data are transferred from the secondary storage 207 to the image combiner 202 via the primary storage 206. As a result, the user stamp is printed on a sheet together with the image data.

The master machine 500 determines whether or not the user stamp is registered at the slave machine 600 via the serial I/F. More specifically, when the user stamp mode is selected on the master machine 500, the master machine 500 determined whether or not the user stamp is registered at the slave machine 600 via the serial I/F. If the user stamp is not registered at the slave machine 600, then master machine 500 performs printing alone. Alternatively, the master machine 500 may send the user stamp registered thereat to the slave machine 600 via the exclusive serial I/F at the time of transfer of image data, in which case the two machines 500 and 600 will operate in the joint mode. After the printing operation, the user stamp registered at the slave machine 600 is deleted.

Figure 12:
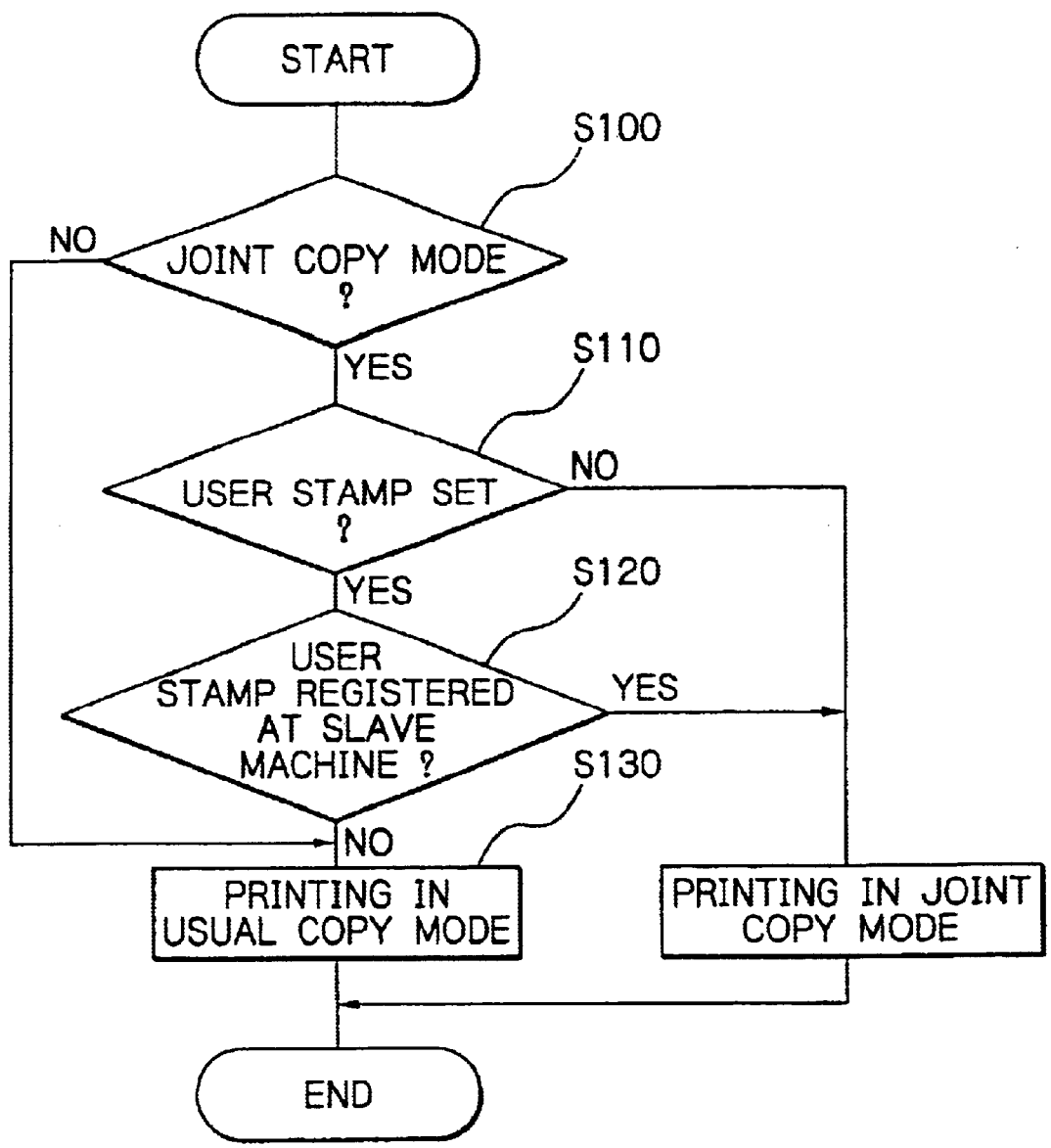
FIG. 12 is a flowchart demonstrating a specific operation of the illustrative embodiment.

A specific procedure to be executed by the master machine 500 will be described with reference to FIG. 12. As shown, the master machine 500 determines whether or not the joint mode is selected (step S100). If the answer of the step S100 is positive (YES), then the master machine 500 determines whether or not a user stamp is registered at the master machine 500 (step S110). If the answer of the step S110 is YES, then the master machine 500 determines whether or not the user stamp is registered at the slave machine 600 (step S120).

If the answer of the step S120 is YES or if the answer of the step S110 is negative (NO), then the master machine 500 performs printing in the joint mode together with the slave machine 600.

If the answer of the step S120 is NO or if the answer of the step S100 is NO, then the master machine 500 performs printing in the usual copy mode alone (step S130).

Figure 13:
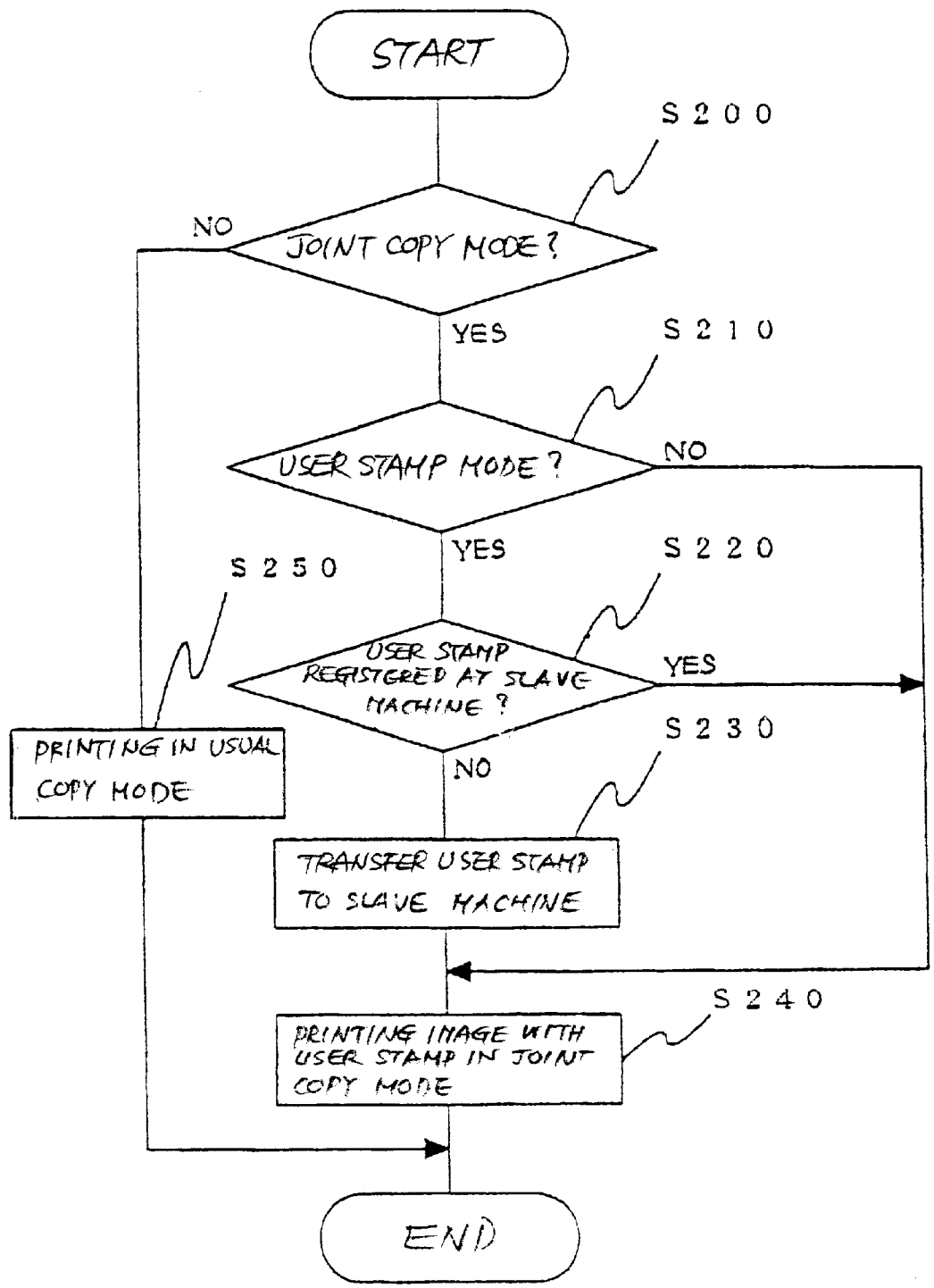
FIGS. 13 and 14 are flowcharts demonstrating another specific operation of the illustrative embodiment.

Another specific procedure available with the illustrative embodiment will be described with reference to FIGS. 13 and 14. FIG. 13 demonstrates the operation of the master machine 500. As shown, the master machine 500 determines whether or not the joint mode is selected (step S200). If the answer of the step S200 is YES, then the master machine 500 determines whether or not a user stamp set mode is selected (step S210). If the answer of the step S210 is YES, then the master machine 500 determines whether or not a user stamp is registered at the slave machine 600 (step S220). If the answer of the step S220 is NO, then the master machine 500 transfers the user stamp to the slave machine 600 (step S230) and then operates in the joint mode (step S240).

If the answer of the step S210 is NO or if the answer of the step S220 is YES, then the master machine 500 performs printing in the joint mode together with the slave machine 600 (step S240). On the other hand, if the answer of the step S200 is NO, then the master machine 500 operates in the usual copy mode alone (step S250).

Figure 14:
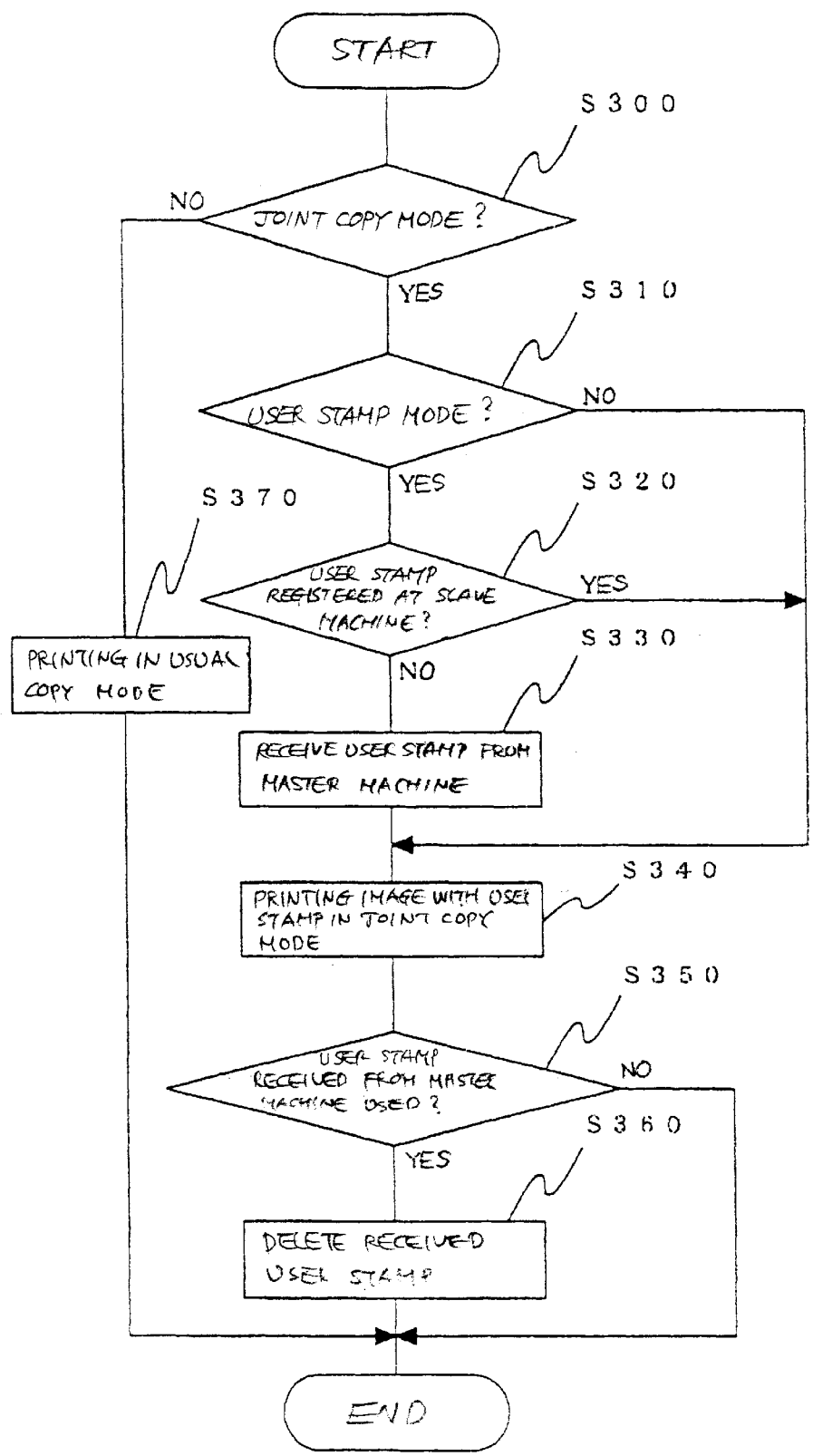

FIG. 14 shows the operation of the slave machine 600 relating to the operation of the master machine 500 described above. As shown, the slave machine 600 determines whether or not the joint mode is selected (step S300). If the answer of the step S300 is YES, the slave machine 600 determines whether or not the user stamp set mode is selected (step 5310). If the answer of the step 5310 is YES, then the slave machine 600 determines whether or not the user stamp is registered thereat (step S320). If the answer of the step 5320 is NO, then the slave machine 600 receives the user stamp from the master machine 500 (step S330) and then operates in the joint mode together with the master machine 500.

If the answer of the step S310 is NO or if the answer of the step S320 is YES, then the slave machine 600 also operates in the joint mode together with the master maschine500 (step S340).

After the joint mode operation, the slave machine 600 determines whether or not the user stamp received from the master machine 500 has been used (step S350). If the answer of the step S350 is YES, then the slave machine 600 deletes the received user stamp (step S360). On the other hand, if the answer of the step S350 is NO, then the procedure ends.

If the joint mode is not selected (NO, step S300), then the slave machine operates in the usual copy mode alone (step S370).

FIG. 16 shows a specific configuration of the CSS or remote diagnosis system. As shown, a management unit 352 and PPCs 200 or similar apparatuses situated at the users' stations are connected by a public telephone network 351. A CCU (Communication Control Unit) 350 is situated at each user's station for controlling communication of the PPCs 200 and the management unit 352. A telephone set or a facsimile apparatus 353 is connectable to the CCU 350 by using the existing subscriber line. While a plurality of PPCs 200 are shown as being connected to the CCU 350, a single PPC may, of course, be connected to the CCU 350. Further, the PPCs 200 connected to the same CCU 350 may be of the same type or of different types or may even be replaced with other apparatuses.

Assume that the maximum number of PPCs 200 connectable to the same CCU 350 is five. Then, the CCU 350 and PPCs 200 are connected by multi-drop connection based on the RS-485 standard. Control over communication between the CCU 350 and the PPCs 200 uses the basic, data transfer control procedure. A data link is set up by a centralized polling/selecting system using the CCU 350 as a control station, so that the CCU 350 can communicate with any one of the PPC 200 connected thereto. Each PPC 200 includes an address setting switch usable to set a value particular to the PPC 200.

In summary, it will be seen that the present invention provides an image forming system having the following various unprecedented advantages. Assume that a plurality of image forming apparatuses operate in a joint copy mode by using a user stamp. Then, when the user stamp is not registered at the destination or slave image forming apparatus, the joint copy mode is automatically canceled to avoid erroneous copying. Alternatively, the master apparatus may execute the joint copy mode with the slave apparatus after transferring the user stamp to the slave apparatus. This makes it needless for the user stamp to be registered at the slave apparatus before the joint mode operation, reducing the operating time.

After the joint mode operation, the slave apparatus can delete the user stamp received from the master apparatus, promoting the effective use of a memory. Moreover, the operator at the slave apparatus can determine whether or not to effect the joint mode operation and can therefore output prints to the operator's taste.

Various modifications will become possible for those skilled in the art after receiving the teachings of the present disclosure without departing from the scope thereof.

What is claimed is:

1. In an image forming system comprising a plurality of image forming apparatuses, said plurality of image forming apparatuses each comprising:

reading means for reading a document;

printing means for printing an image read by said reading means;

joint operation means for transferring the image read by said reading means to another image forming apparatus and causing said another image forming apparatus to print said image;

joint copy mode selecting means for commanding said joint operation means to execute a joint copy mode operation;

registering means for allowing an operator to register a user stamp to be combined with the image read by said reading means in the event of printing;

combining means for combining the user stamp and the image read by said reading means; and decision means for determining whether or not the user stamp is registered at the another image forming apparatus to which said joint operation means has transferred the image;

wherein when the joint copy mode operation is selected and if the user stamp is registered at the another image forming apparatus, as determined by said decision means, said joint operation means executes the joint copy mode operation.

2. The system as claimed in claim 1, wherein when the joint copy mode operation is selected, but if the user stamp is not registered at the another image forming apparatus, as determined by said decision means, said joint copy mode selecting means determines whether or not to execute the joint copy mode operation.

3. The system as claimed in claim 1, wherein when the joint copy mode operation is selected, but if the user stamp is not registered at the another image forming apparatus, as determined by said decision means, said joint operation means transfers the user stamp from the image forming apparatus to the another image forming apparatus and then executes the joint copy mode operation.

4. The system as claimed in claim 3, wherein the another image forming apparatus deletes the user stamp transferred thereto on completing the joint copy mode operation.

5. The system as claimed in claim 1, wherein when the joint copy mode operation is selected, but if the user stamp is not registered at the another image forming apparatus, as determined by said decision means, said joint copy mode selecting means determines whether or not to execute the joint copy mode operation.

6. The system as claimed in claim 5, where in the another image forming apparatus deletes the user stamp transferred thereto on completing the joint copy mode operation.

7. In an image forming system comprising a plurality of image forming apparatuses, said plurality of image forming apparatuses each comprising:

a reading device configured to read a document;

a printing device configured to print an image read by said reading device;

a joint operation device configured to transfer the image read by said reading device to another image forming apparatus and to cause said another image forming apparatus to print said image;

a joint copy mode selecting device configured to command said joint operation device to execute a joint copy mode operation;

a registering device configured to allow an operator to register a user stamp to be combined with the image read by said reading device in the event of printing;

a combining device configured to combine the user stamp and the image read by said reading device; and a decision device configured to determine whether or not the user stamp is registered at the another image forming apparatus to which said joint operation device has transferred the image;

wherein when the joint copy mode operation is selected and if the user stamp is registered at the another image forming apparatus, as determined by said decision device, said joint operation device executes the joint copy mode operation.

8. The system as claimed in claim 7, wherein when the joint copy mode operation is selected, but if the user stamp is not registered at the another image forming apparatus, as determined by said decision device, said joint copy mode selecting device determines whether or not to execute the joint copy mode operation.

9. The system as claimed in claim 7, wherein when the joint copy mode operation is selected, but if the user stamp is not registered at the another image forming apparatus, as determined by said decision device, said joint operation device transfers the user stamp, from the image forming apparatus to the another image forming apparatus and then executes the joint copy mode operation.

10. The system as claimed in claim 9, wherein the another image forming apparatus deletes the user stamp transferred thereto on completing the joint copy mode operation.

11. The system as claimed in claim 7, wherein when the joint copy mode operation is selected, but if the user stamp is not registered at the another image forming apparatus, as determined by said decision device, said joint copy mode selecting device determines whether or not to execute the joint copy mode operation.

12. The system as claimed in claim 11, wherein the another image forming apparatus deletes the user stamp transferred thereto on completing the joint copy mode operation.

13. In an image forming system comprising a plurality of image forming apparatuses, said plurality of image forming apparatuses each comprising:

a reading device configured to read a document;

a printing device configured to print an image read by said reading device;

a joint operation device configured to transfer the image read by said reading device to another image forming apparatus and to cause said another image forming apparatus to print said image;

a joint copy mode selecting device configured to command said joint operation device to execute a joint copy mode operation;

a registering device configured to allow an operator to register a user stamp to be combined with the image read by said reading device in the event of printing;

a combining device configured to combine the user stamp and the image read by said reading device; and a decision device configured to determine whether or not the user stamp is registered at the another image forming apparatus to which said joint operation device has transferred the image;

wherein the joint operation device transfers the user stamp to the another image forming apparatus if the decision device determines that the user stamp is not registered at the another image forming apparatus when the joint copy mode operation is selected.

14. The system as claimed in claim 13, wherein the joint operation device executes the joint copy mode operation if the user stamp is registered at or has been transferred to the another image forming apparatus when the joint copy mode operation is selected.

15. The system as claimed in claim 14, wherein the another image forming apparatus deletes the user stamp after the joint copy mode operation.

* * * * *